United States Patent [19]

Hoover

[11] Patent Number: 5,054,427
[45] Date of Patent: * Oct. 8, 1991

[54] INSERTABLE STACKING PET TOY MAZE

[76] Inventor: Judith L. Hoover, 3108 Killian Rd., Uniontown, Ohio 44685

[ * ] Notice: The portion of the term of this patent subsequent to Sep. 4, 2007 has been disclaimed.

[21] Appl. No.: 574,465

[22] Filed: Aug. 28, 1990

Related U.S. Application Data

[63] Continuation-in-part of Ser. No. 410,256, Sep. 21, 1989, Pat. No. 4,953,502.

[51] Int. Cl.$^5$ .............................................. A01K 15/00
[52] U.S. Cl. ................................... 119/29; 273/153 R
[58] Field of Search ............. 119/29; 273/153 R, 113; 272/19

[56] References Cited

U.S. PATENT DOCUMENTS

| | | | |
|---|---|---|---|
| 1,562,006 | 11/1925 | Sichterman | 446/106 |
| 2,261,804 | 11/1941 | Hall | 273/153 R |
| 3,260,236 | 7/1966 | Jones | 119/29 |
| 3,406,971 | 10/1968 | Koff | 273/153 R |
| 3,857,364 | 12/1974 | Miller, Jr. | 119/29 |
| 3,924,857 | 12/1975 | Christensen | 273/153 R |
| 4,677,938 | 7/1987 | Tominaga | 119/29 |
| 4,822,047 | 4/1989 | Treer | 273/153 R |
| 4,824,098 | 4/1989 | Huang | 273/153 R |
| 4,953,502 | 9/1990 | Hoover | 119/29 |

Primary Examiner—Paul J. Hirsch

[57] ABSTRACT

A single- or multi-level transparent insertable stacking maze pet toy designed for use in an auxiliary containment structure, preferably a commonly available animal cage such as a 10-gallon tank, and comprising alternately stacking maze elements and horizontal planar surfaces, which form compartments through which a small animal can travel, with efficient means for changing the maze routes. Also called a three-dimensional maze in its multi-level form. The maze elements further comprise vertical wall units. In the preferred embodiment flat rectangular wall units also called grid elements span the containment structure longitudinally and transversely and interlock at right angles by means of slots placed along their lengths at intervals. A pluraliy of apertures are placed indeterminately along the wall units between the slots. Maze routes can be changed by interchanging wall units and repositioning planar surfaces. The maze encourages burrowing activity in small animals and entices children to restructure maze routes. While providing more play area, it preserves the original amount of living space above the top planar surface. It accommodates and supports food, bedding, and toys. The design is eye appealing, unobstructive to viewing, and easy to clean. Repetition of wall units and planar surfaces and elimination of a containment structure provide advantages in manufacturing, transporting, packaging, and retailing.

18 Claims, 2 Drawing Sheets

INSERTABLE STACKING PET TOY MAZE

CROSS-REFERENCE TO RELATED APPLICATION

This application is a continuation-in-part of U.S. application Ser. No. 410,256, filed Sept. 21, 1989, now U.S. Pat. No. 4,953,502, granted Sept. 4, 1990.

BACKGROUND

1. Technical Field

The present invention relates to a pet toy maze for small animals (hamsters, gerbils, mice, or other small animals), specifically a single- or multi-level transparent, insertable, stacking maze pet toy designed for use in an auxiliary containment structure and comprising alternately stacking maze elements and horizontal planar surfaces that allow passage of a small animal throughout the assembly and between the compartments formed by the planar surfaces, maze elements, and containment structure with means for changing the maze routes involving the repositioning or rearrangement of horizontal planar surfaces, maze elements, or both.

2. Description of Prior Art

Mazes of labyrinths have been known for an indeterminable number of years. Used in both the fields of science and entertainment, the object has commonly been to move oneself, an animal, or an object through the maze as quickly as possible.

Some mazes have been three-dimensional or multi-level, using unitary or modular containment structures which add bulk and expense; many have been designed for the capability of changing maze routes, usually with many different, small, complex and interlocking parts, which a child would have difficulty handling, an animal would find very chewable, and germs would find inviting; at least one maze-type exercising device for animals exists which is designed for use in a breeding box, but it is not designed for change or expansion, does not take advantage of the burrowing instincts of small animals, and cannot easily accommodate food, bedding, and toys.

Discussing the prior art more specifically, U.S. Pat. No. 4,824,098 to Huang discloses a three-dimensional maze game which includes a containment structure in the form of stacked casings, interlocking septa and level plates with holes, and dumbbell devices for altering maze routes. Although he stacks septa and plates independently, he requires a containment structure, inefficiently uses dumbbell devices for changing routes rather than limiting the number and varying the placement of holes and repositioning or interchanging plates and septa. These resilient dumbbell blockades would be easily chewed by a small animal, difficult to sanitize, and inhibit viewing. Moreover, he is not concerned with utilizing an existing animal cage or preserving uncompartmentalized living space above the top planar surface.

U.S. Pat. No. 2,261,804 to Hall discloses a three-dimensional maze which includes a closed container and a plurality of cubicles with apertures which form a predetermined, fixed maze. There is a lack of independence of parts, an integral containment structure, and no flexibility within this closed structure.

Each of the four patents, U.S. Pat. Nos. 3,857,364 to Miller, Jr., 3,260,236 to Jones, 3,516,389 to Meyer, and 4,743,023 to Collier, disclose maze structures which include containment by means of bottoms, walls, and tops, and each uses small parts such as posts and clips in addition to basic wall panels to create a changeable structure which in each case is dependent on the base surface of the containment structure for assembly and not merely support.

Miller, Jr. uses modular floor units with peripheral walls and a clear cover for total containment, and he uses grooved posts in holes and many short wall panels in a necessarily connected and dependent relation with the floor for maze definition. He lacks the simplicity of a free-standing, stacking, insertable design.

Jones uses a multi-sided base with perforated clip-on top plus bendable walls for integral containment, and his interior panels require that tabs be inserted into floor slots for support and form rather than standing independently. There is nothing to suggest a free-standing, stacking, insertable variation.

Meyer uses a modular base with slots and modular walls and top for integral containment, and his walls necessarily depend on base slots and require clips and hinges. Again, there is no free-standing, stacking, insertability.

Collier uses separable container modules with grooved posts, and his wall panels must depend on these posts rather than being self-supporting. Hence, the container module is integral to the design, and the modules are clipped together for stacking, a more cumbersome structure than free-standing, insertable maze elements and planar surfaces.

U.S. Pat. No. 4,677,938 to Tominaga discloses a unique vertical maze currently on the market. Although the maze cleverly uses a foreign structure for completion, the maze is virtually unchangeable, thereby discouraging child interaction, it is not expandable by stacking an arbitrary number of planar surfaces and maze elements, it reduces noncompartmentalized living space, unlike the present invention which preserves the original amount of floor space above the uppermost planar surface, and by virtue of its vertical orientation, it cannot easily accommodate or support food, bedding, and toys, nor does it encourage the burrowing activity of small animals below a surface level.

Also on the market for small animals are interconnecting plastic tubes. While such a concept is unlimited in the number of possible variations, it can become costly, require substantially more space for equivalent complexity, be more difficult to clean, and can accidentally come apart.

The present invention offers several advantages over the prior art. The horizontal nature of the maze encourages the burrowing instinct of the small animal, particularly when his food, bedding, and toys are placed above the assembly, at least until he rearranges everything to suit himself. The use of one or two assemblies (maze element with planar surface) creates more usable floor space, especially important with multiple pets, and, in addition to the underground compartments, preserves the original amount of uncompartmentalized living space as before the maze was inserted. As is recommended in any case, the cage should have a secure lid.

Another advantage of the present invention is that with free-standing maze elements not requiring complex parts, a child can enjoy changing his animal's cage design and easily clean house. The simplicity also creates more eye appeal than some mazes. Although the invention favors small animal's burrowing behavior, he is nonetheless viewable at all levels.

Moreover, the maze could be expanded over a period of time and multiple purchases, and repetition of planar surfaces and wall units which form the maze elements, plus the elimination of the containment structure keep the manufacturing cost down. The independence of the maze elements and the planar surfaces and the potential for the entire assembly of the preferred embodiment to be broken down into flat pieces reduces transportation, packaging, and retailing requirements.

SUMMARY OF THE INVENTION

The present invention, generally stated, provides a single- or multi-level insertable, stacking pet toy maze designed for use in an auxiliary containment structure particularly a commonly available 10-gallon tank, and comprising alternately stacking maze elements and horizontal planar surfaces, which together allow passage of a small animal throughout the assembly and between the compartments formed by the maze elements, planar surfaces, and containment structure, with efficient means for changing maze routes involving the repositioning or rearrangement of planar surfaces, maze elements, or both.

Alternately, the invention may be defined as a three-dimensional pet toy maze comprising a plurality of maze elements formed by vertical wall units and a plurality of horizontal planar surfaces which separate the maze elements, with efficient means for changing maze routes employing the repositioning or rearrangement of any or all of horizontal planar surfaces, maze elements, or vertical wall units. The term "three-dimensional" is intended to be equivalent to the term "multi-level", and the term "insertable" derives from the independence of the disclosed maze from a containment structure. In the preferred embodiment, the maze element is formed by vertical wall units which are called grid elements due to their parallel alignment.

It is an object of the present invention to provide a maze designed for easy insertion into and efficient use in an auxiliary containment structure, such as a commonly available 10-gallon tank.

It is another object of the present invention to provide a maze which can be stacked in one or more levels and expanded gradually.

It is another object of the present invention to provide a maze composed of simple elements which are attractive, easy for a child to handle, and which present no difficulty in cleaning or obstruction to viewing.

It is another object of the present invention to provide a maze which encourages human interaction to assemble and alter the arrangement of the elements and animal paths.

It is yet another object of the present invention to provide a maze which arouses the curiosity of a small animal, challenges him to learn changing maze routes and encourages his innate burrowing instinct.

It is still another object of the present invention to provide a maze which creates additional floor space in an animal habitat, while not reducing the original amount of uncompartmentalized space, and supports or accommodates food, bedding, and toys in an appealing and viewable arrangement.

Finally, it is an object of the present invention to provide a maze which is economical to manufacture, transport, package, and retail due to the simplicity of design, repetition of pieces, the elimination of a containment structure, and the compactness of the disassembled product.

These and other objects and advantages of the present invention will become apparent by reference to the drawings and the detailed description of various embodiments.

DETAILED DESCRIPTION OF THE INVENTION

Figure 1:
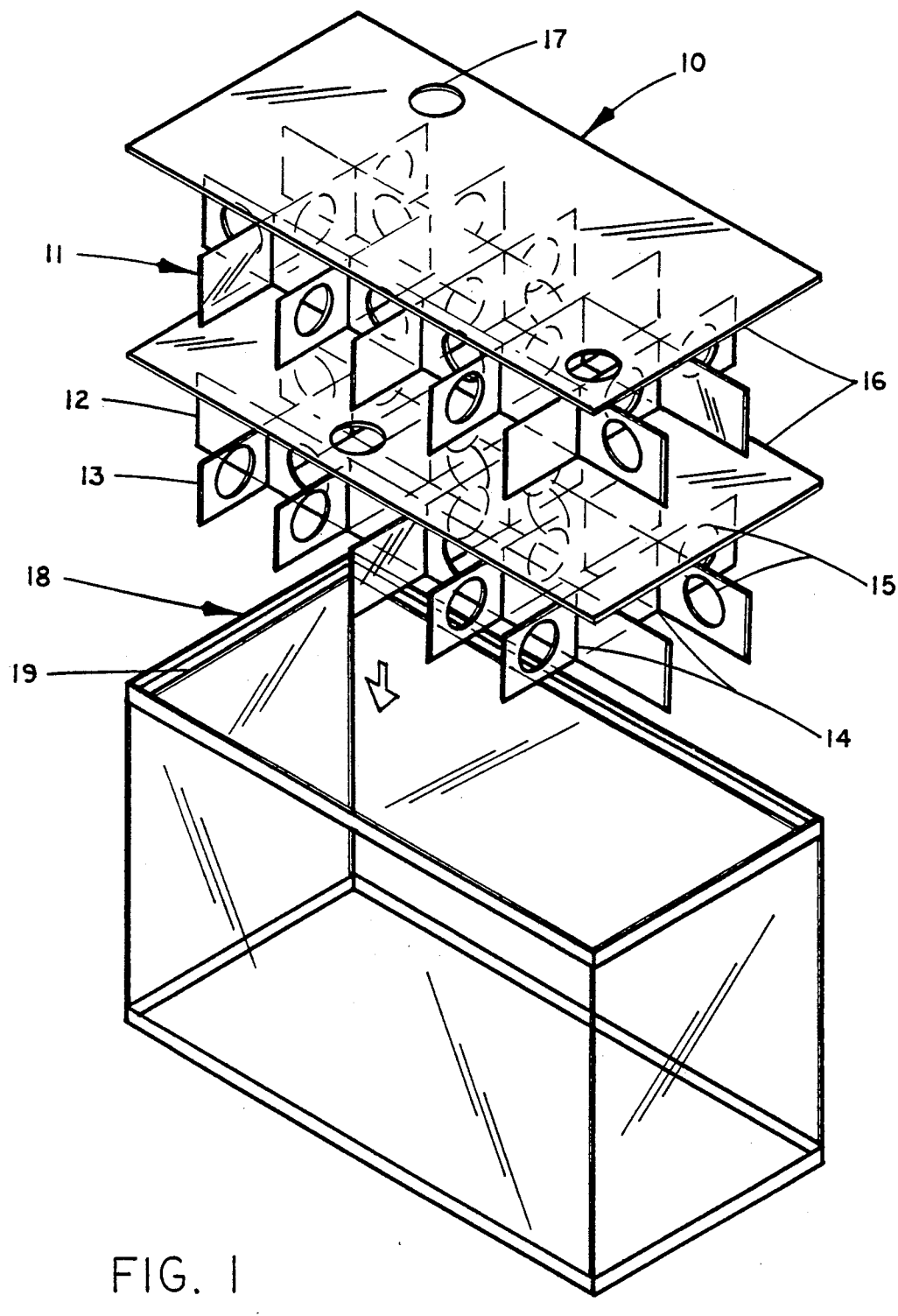
FIG. 1 is an isometric view of the preferred embodiment of a stacking, insertable maze pet toy assembled for use inside a 10-gallon tank and showing two levels. With more than one level it is also termed a three-dimensional maze. The maze elements have interchangeable vertical wall units, with interlocking slots and apertures, spanning the containment structure longitudinally and transversely. In the preferred embodiment, these vertical wall units are also called grid elements due to their parallel alignment. Horizontal planar surfaces rest independently above the maze elements in an alternately stacking arrangement.

Referring now to the drawings, in FIG. 1 the preferred embodiment of the three-dimensional or insertable stacking maze 10 is shown with two levels assembled and stacked and in dimensions closely matching or compatible with a 10-gallon terrarium 18. The maze 10 can be designed to fit any size or shape of containment structure, or may include its own, but eliminating this structure provides a very economical approach to a toy.

While the maze 10 can be made from clear polystyrene or acrylic, the conventional 10-gallon tank 18 has a lip or flange 19 around the top which presents a problem when inserting several planar surfaces. The insertion of full-sized horizontal planar surfaces 16 which fit snugly around the perimeter can be facilitated by the use of more flexible plastic, which can also be used for the maze elements. One suitable material is an FDA-approved mar-resistant type known as PETG in a thickness of 0.060". Other materials and thicknesses will also work.

A one-level maze provides an entertaining toy for both a small animal and a child, especially when it can be rearranged; two or more levels may be used to increase play area and complexity for a multitude of pets, and provided that all horizontal planar surfaces 16 are located somewhat lower than the top of the containment structure, they do so without reducing the original amount of uncompartmentalized living space on top and being limited only by the height of the cage.

Ideally there is an independence of major parts for convenience and flexibility. The insertability of the maze is quick and easy for cleaning and changing maze routes because there is no attachment or intricate interrelation between the maze 10 and the containment structure 18. The relationship is one of simple support and enclosure. This design also allows the containment structure to be a foreign structure, including a smooth glass terrarium.

Not absolutely necessary but highly advantageous is the same independence between horizontal planar surfaces 16 and maze elements 11. The maze 10 can be inserted one level at a time or the maze elements 11 can be assembled if necessary inside the containment structure 18, but a self-supporting maze element 11 that doesn't have to be attached to a base eliminates the need for a duplicate bottom and is generally easier to handle.

Each horizontal planar surface 16 has at least one aperture to allow animal passage from one level or maze element to another level or maze element. The maze routes may be changed by reversing, horizontally rotating, and interchanging these horizontal planar surfaces, or more broadly stated, by repositioning them.

Figure 2:
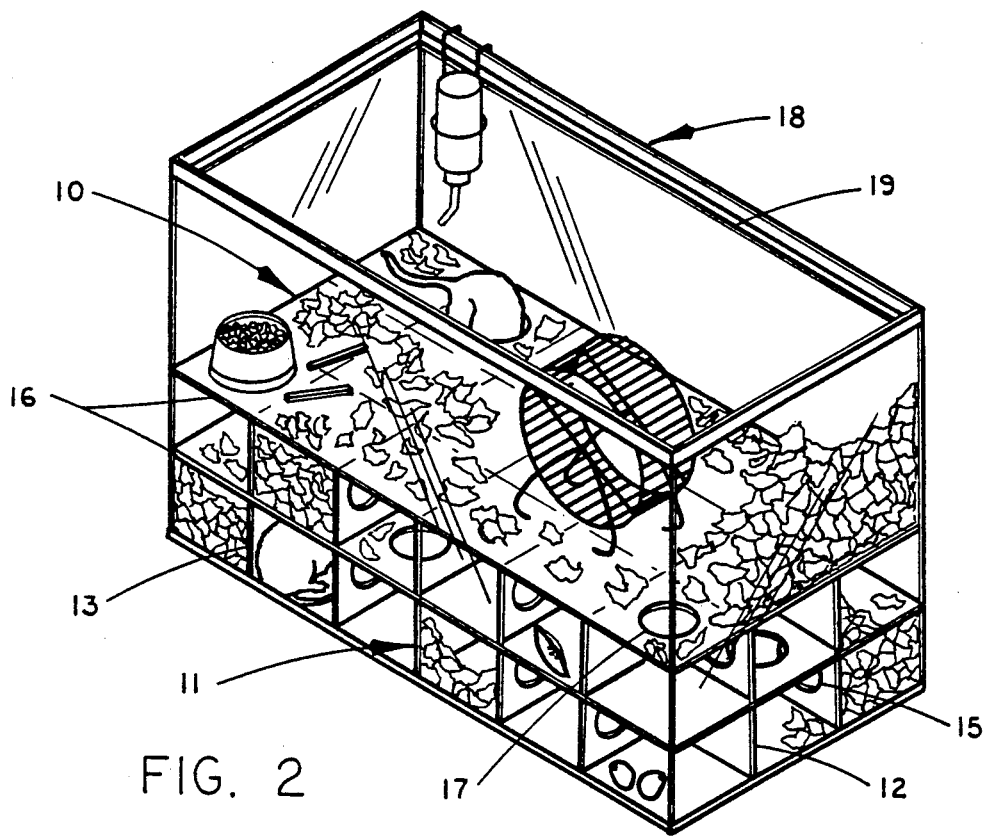
FIG. 2 is an isometric view of the preferred embodiment of a stacking, insertable maze pet toy assembled inside a 10-gallon terrarium, shown concealing treats and supporting food, bedding, and toys.
Figure 3:
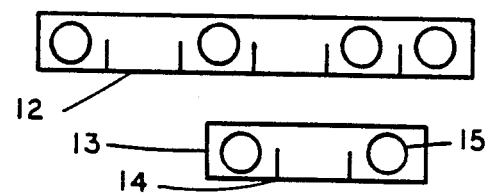
FIG. 3 is a front plan view of one longitudinal wall unit and one transverse wall unit which form the maze elements of the preferred embodiment shown in FIG. 1 and 2.

The maze element 11 itself is formed by one or more flat, linear, rectangular, and vertical wall units, shown in FIG. 1, 2, and 3 as longitudinal wall units 12 or grid elements with interlocking slots 14 one-half the height of the units, spaced at intervals, and wide enough to accept transverse wall units 13 or grid elements with identical slots 14 facing in the opposite direction, the perpendicular combination of wall units 12 and 13 forming a plurality of compartments on any level. The longitudinal wall units 12 span the entire length of the cage, and the transverse wall units 13 span the entire width, providing uniform support for the planar surfaces above. Between some of the slots 14 and slots and ends of the wall units 12 and 13 of the preferred embodiment are apertures 15 which are large enough to accommodate passage of a small animal. They are shown as round but could easily be another shape. The random and indeterminate number and placement of these apertures 15 in the vertical wall units allows the maze routes to be changed by interchanging vertical wall units, thereby relocating the apertures.

While the preferred embodiment shown in FIGS. 1 and 2 offers changeability, stability, free-standing maze elements, and economical repetition of flat pieces, other embodiments are possible using different wall units.

Figure 4:
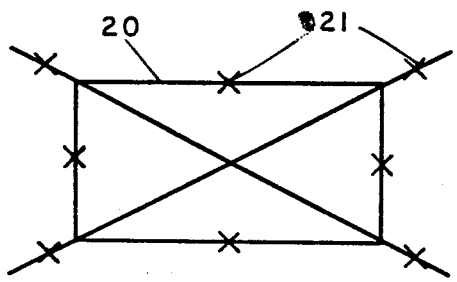
FIG. 4 is a top plan view of a unitary maze element of an alternate embodiment of the maze, which gives uniform support to the planar surface and has aperture locations indicated.

Alternately, the maze element may be a unitary element not requiring assembly. One such unitary maze element 20 is shown in FIG. 4, with apertures 21 indicated by x's. This design provides uniform support for the planar surface above and also encourages the small animal to travel around the perimeter of the cage.

Figure 5:
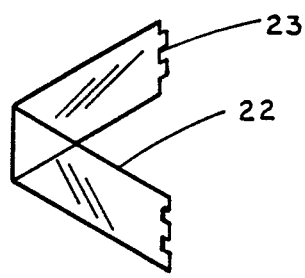
FIG. 5 is a perspective view of a bent-angle wall unit of another alternate embodiment. These wall units interlock at any angle to form a maze element by means of notches on each end.
Figure 6:
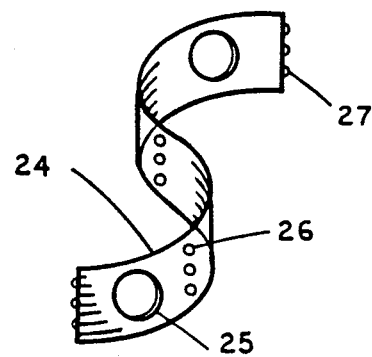
FIG. 6 is a perspective view of a curved wall unit of still another embodiment, wherein a snap-fitting of several wall units is accomplished by inserting the end projections of one wall unit into the lateral indentations of another, to form an irregular maze element which has enough structure to support a planar surface.

The maze elements may also be constructed using linear wall units, bent-angle wall units such as unit 22 shown in FIG. 5 or curved wall units such as unit 24 shown in FIG. 6. They may be separate and discrete or be connected by means including but not limited to the following: interlocking with end notches 23 as shown in FIG. 5, snap-fitting with projections 27 and indentations 26 as shown in FIG. 6, or ring-bound, and possibly hinge-pinned. They may or may not be identical. Passage may be achieved through apertures such as round holes 25 in FIG. 6, or gaps can be left between wall units. The wall units may be just high enough for an animal or much higher than its height. Many other variations are possible. In most cases, maze routes can be restructured by interchanging or repositioning these wall units. Virtually any element of the present invention described could have optional ventilation holes.

While in accordance with the patent statutes the best mode and preferred embodiment of the invention has been described, it is to be understood that the invention is not limited thereto, but rather is to be measured by the scope and spirit of the appended claims.

What is claimed is:

1. An insertable small animal maze for use in a containment structure and comprising:
   at least one maze element for guiding and restricting animal travel, said maze element further comprising at least one vertical wall unit;
   at least one horizontal planar surface with at least one aperture large enough for animal passage;
   wherein the maze elements and horizontal planar surfaces are alternately stackable and both are insertable into said containment structure, and further,
   a first means for allowing change of maze routes wherein the horizontal planar surfaces are repositionable or rearrangeable, thereby relocating said at least one aperture in the horizontal planar surfaces.

2. The insertable small animal maze defined in claim 1 wherein the maze element is unitary and self-supporting, thereby facilitating stacking and insertion.

3. The insertable small animal maze defined in claim 1 wherein each said vertical wall unit is discrete, self-supporting and not connected to the planar surfaces, containment structure, or another vertical wall unit, and repositionable.

4. The insertable small animal maze defined in claim 1 wherein the vertical wall units further comprise grid elements, said grid element being flat, rectangular in shape, possessing slots located along their lengths for engaging in interlocking relationships with each other, wherein an indeterminate number of apertures large enough for animal passage exist between said slots, the maze further comprising additional means for allowing change of maze routes wherein the grid elements are interchangeable, thereby relocating said apertures in the maze element.

5. The insertable small animal maze defined in claim 1 wherein all the maze elements and all the horizontal planar surfaces are located somewhat below the top of the containment structure, thereby allowing preservation of the original uncompartmentalized floor space in the containment structure and encouraging the natural burrowing instinct of a small animal to travel below a surface level.

6. The insertable small animal maze defined in claim 1 wherein the horizontal planar surfaces possess dimensions closely matching those of the containment structure, thereby effecting a somewhat snug fit along the perimeter of the horizontal planar surfaces, and further, are made of flexible material, thereby allowing easy insertion past a lip or flange on the containment structure.

7. An insertable small animal maze for use in a containment structure and comprising:
   at least one maze element for guiding and restricting animal travel, said maze element further comprising at least one vertical wall unit;

at least one horizontal planar surface with at least one aperture large enough for animal passage; wherein the maze elements and horizontal planar surfaces are alternately stackable and insertable into said containment structure, and further, wherein all the maze elements and all the horizontal planar surfaces are located somewhat below the top of the containment structure, thereby allowing preservation of the original uncompartmentalized floor space in the containment structure and encouraging the natural burrowing instinct of a small animal to travel below a surface level.

8. The insertable small animal maze defined in claim 7 wherein the maze element is unitary and self-supporting, thereby facilitating stacking and insertion.

9. The insertable small animal maze defined in claim 7 wherein each said vertical wall unit is discrete, self-supporting and not connected to the planar surfaces, containment structure, or another vertical wall unit, and repositionable.

10. The insertable small animal maze defined in claim 7 wherein the vertical wall units further comprise grid elements, said grid element being flat, rectangular in shape, possessing slots located along their lengths for engaging in interlocking relationships with each other, wherein an indeterminate number of apertures large enough for animal passage exist between said slots, the maze further comprising means for allowing change of maze routes wherein the grid elements are interchangeable, thereby relocating said apertures in the maze element.

11. The insertable small animal maze defined in claim 7 wherein the horizontal planar surfaces possess dimensions closely matching those of the containment structure, thereby effecting a somewhat snug fit along the perimeter of the horizontal planar surfaces, and further, are made of flexible material, thereby allowing easy insertion past a lip or flange on the containment structure.

12. A three-dimensional maze for small animal maze for use in a containment structure and comprising:
    a plurality of maze elements for guiding and restricting animal travel, said maze element further comprising at least one vertical wall unit;
    a plurality of horizontal planar surfaces with at least one aperture large enough for animal passage; wherein the maze elements and horizontal planar surfaces are alternately stackable and insertable into said containment structure, and further, wherein all the maze elements and all the horizontal planar surfaces are located somewhat below the top of the containment structure, thereby allowing preservation of the original uncompartmentalized floor space in the containment structure and encouraging the natural burrowing instinct of a small animal to travel below a surface level.

13. The three-dimensional maze for small animals defined in claim 12 wherein the maze elements are unitary and self-supporting, thereby facilitating stacking and insertion.

14. The three-dimensional maze for small animals defined in claim 12 wherein each said at least one aperture vertical wall unit is discrete, self-supporting and not connected to the planar surfaces, containment structure, or another vertical wall unit, and repositionable.

15. The three-dimensional maze for small animals defined in claim 12 wherein the vertical wall units further comprise grid elements, said grid element being flat, rectangular in shape, possessing slots located along their lengths for engaging in interlocking relationships with each other, wherein an indeterminate number of apertures large enough for animal passage exist between said slots, the maze further comprising additional means for allowing change of maze routes wherein the grid elements are interchangeable, thereby relocating said apertures in the maze element.

16. The three-dimensional maze for small animals defined in claim 15 further including the containment structure.

17. The three-dimensional maze for small animals defined in claim 12 further including a means for allowing change of maze routes wherein the horizontal planar surfaces are repositionable or rearrangeable, thereby relocating said at least one aperture in the horizontal planar surfaces.

18. The three-dimensional maze for small animals defined in claim 12 wherein the horizontal planar surfaces posses dimensions closely matching those of the containment structure, thereby effecting a somewhat snug fit along the perimeter of the horizontal planar surfaces, and further, are made of flexible material, thereby allowing easy insertion past a lip or flange on the containment structure.

* * * * *